Patented Apr. 8, 1930

1,753,643

UNITED STATES PATENT OFFICE

JOHN W. BECKMAN, OF OAKLAND, CALIFORNIA

METHOD OF PROCESSING CEREAL GRAINS

No Drawing.   Application filed March 20, 1929.   Serial No. 348,664.

My invention relates to the processing of cereal grains in their natural state for the purpose of preparing them for the market so that they will retain to the maximum degree the valuable food elements originally contained therein, will be improved in appearance and keeping qualities, and the cost reduced.

A further object is the bleaching and sterilizing of the cereal grain without destroying the seed coat.

My invention is particularly adapted to the treatment of rice which heretofore has been generally prepared for the market by what is generally known as the polishing treatment, which involves the removing of the bran, and with it a considerable amount of the grain kernel from the rice grains. Although this has generally improved the appearance, its object has also been to avoid the deterioration of the oil contained in the surface layers, the removal of which layers and oil also reduce the liability to subsequent infection with weevils.

By my process all of these objects are attained without the removal of the valuable food elements contained in the surface layers; as the coating of the seed or grain kernel is retained with its full food values.

These objects I attain by treating the cereal grains with suitable bleaching agents such as sodium sulphate, hydrogen peroxide, sodium hypo-chloride, or any suitable fat solvent, alone or combined, and any other bleaching medium, and I thereby obtain a product uniform in color and of high edible and commercial value.

The product resulting from my treatment retains the proteins and the vitamines, oil and fats and other elements of food value within the rice grain and hull.

The process involves the bleaching and leaching and sterilizing of the grain. And by the leaching soluble soaps are formed and the surface oil only is removed and the grains sterilized thus insuring the keeping qualities and preventing the development of later rancidity. By the bleaching action the color is made uniform and improved.

As an example of my process and product I will describe its application and the result obtained in the treatment of rice.

The hulled rice is first treated, for example, in a one fourth of one percent (.25%) solution of sodium peroxide at a temperature of 60° C. or below for a period of about ten minutes. Dilute solutions of other bleaching agents as mentioned above may be substituted with the addition of a one fourth of one percent (.25%) of a caustic or carbonate that is soluble, in place of the sodium peroxide, as for example the hydrate or carbonate of sodium or potassium, thus securing the bleaching and sterilizing and solvent action by a plurality of reagents.

After the above treatment the rice is washed until substantially free from alkali, drained and dried preferably in a vacuum dryer at a temperature of 60° C. or less.

It is advisable to keep the temperature within the limit specified to avoid deterioration of the vitamines. The rice may be dried if preferred at atmospheric temperature, the choice being one of relative economy in any particular case.

The time involved in the drying will of course vary in different cases and the extraction of moisture should continue until there is only 8 to 10% water content remaining in the finished product.

Although I have described the treatment of rice by my process and the product resulting therefrom, other grains may be treated, as rye, wheat, oats, or in fact any of the cereal grains and I desire to be understood as claiming all such.

By my treatment any germ life is destroyed and the surface oil heretofore subject to becoming rancid and spoiling the product, is removed, resulting in a product of better appearance and keeping qualities and of higher food value.

I claim:

1. The process of treating cereal grains which consists in subjecting the grains to a solution of substantially one-quarter of 1% of sodium peroxide whereby the grains are bleached and the surface fats are extracted and then washing and drying the grains.

2. The process of treating cereal grains which consists in subjecting them to the action of a solution containing substantially one-quarter of 1% of sodium peroxide for a period of substantially ten minutes and at a temperature of substantially 60° C. or less and then washing and drying the grains.

JOHN W. BECKMAN.